US012768779B2

(12) United States Patent
Liu et al.

(10) Patent No.: US 12,768,779 B2
(45) Date of Patent: Oct. 20, 2026

(54) DEVICE FOR MEASURING OPTICAL SPECTRUM OF FLOWING LIQUID

(71) Applicants: Nanjing Hanshu Environmental Protection Equipment Co., Ltd., Nanjing (CN); Guo Liu, Nanjing (CN)

(72) Inventors: Guo Liu, Nanjing (CN); Xiaohan Liu, Nanjing (CN)

(73) Assignees: Nanjing Hanshu Environmental Protection Equipment Co., Ltd., Nanjing (CN); Guo Liu, Nanjing (CN)

(*) Notice: Subject to any disclaimer, the term of this patent is extended or adjusted under 35 U.S.C. 154(b) by 29 days.

(21) Appl. No.: 19/087,590

(22) Filed: Mar. 24, 2025

(65) Prior Publication Data

US 2025/0216324 A1 Jul. 3, 2025

Related U.S. Application Data

(63) Continuation of application No. PCT/CN2023/103389, filed on Jun. 28, 2023.

(30) Foreign Application Priority Data

Oct. 14, 2022 (CN) ......................... 202211260061.2

(51) Int. Cl.
*G01N 21/31* (2006.01)
*G01N 21/05* (2006.01)
(Continued)

(52) U.S. Cl.
CPC ............. *G01N 21/31* (2013.01); *G01N 21/05* (2013.01); *G01N 21/07* (2013.01); *G01N 21/534* (2013.01);
(Continued)

(58) Field of Classification Search
CPC ..... G01N 2021/0314; G01N 2021/052; G01N 2021/054; G01N 2021/4764;
(Continued)

(56) References Cited

U.S. PATENT DOCUMENTS 3,813,031 A * 5/1974 Anderson .............. G01N 21/07 494/44
5,122,284 A * 6/1992 Braynin ............... G01N 33/491 436/63
(Continued)

FOREIGN PATENT DOCUMENTS

CN 107167435 A 9/2017
CN 208155855 U 11/2018
(Continued)

OTHER PUBLICATIONS

Internation Search Report of PCT/CN2023/103389, Mailed Sep. 21, 2023.

*Primary Examiner* — Gordon J Stock, Jr.

(57) ABSTRACT

A device for measuring an optical spectrum of a flowing liquid comprises a flowing liquid mechanism comprising a valve body with a valve cavity formed therein, an outer wall of the valve body being further provided with a valve-cavity through opening communicated with the valve cavity, the valve-cavity through opening being arranged tangential to the valve cavity, and a gas/liquid port communicated with the valve cavity being formed in a center of the valve body; and a detection mechanism comprising a transmitting assembly, the transmitting assembly being located on one side of the valve body and configured to transmit detection light, and the detection light transmitted by the transmitting assembly penetrating through a liquid flowing in the valve cavity; a receiving assembly configured to receive the detection light penetrating through the flowing liquid and gener-
(Continued)

ate a detection signal; and a processing module configured to receive and process the detection signal.

13 Claims, 14 Drawing Sheets

(51) Int. Cl.

| | |
|---|---|
| ***G01N 21/07*** | (2006.01) |
| ***G01N 21/53*** | (2006.01) |
| ***G01N 21/55*** | (2014.01) |

(52) U.S. Cl.
CPC ....... *G01N 21/55* (2013.01); *G01N 2021/052* (2013.01); *G01N 2021/054* (2013.01)

(58) Field of Classification Search
CPC ........... G01N 2021/4769; G01N 21/05; G01N 21/07; G01N 21/15; G01N 21/31; G01N 21/534; G01N 21/55; G01N 21/53; G01N 21/532; G01N 21/538; G01N 21/4738; G01N 2201/1211; G01N 2201/0627; G01N 33/18
See application file for complete search history.

(56) References Cited

U.S. PATENT DOCUMENTS

| | | | |
|---|---|---|---|
| 5,923,431 A | 7/1999 | Masterson et al. | |
| 6,049,388 A | 4/2000 | Masterson et al. | |
| 9,880,090 B2 * | 1/2018 | Charlton | G01N 21/05 |
| 10,895,531 B2 * | 1/2021 | Rahmlow | G01N 15/0211 |
| 2009/0051901 A1 | 2/2009 | Shen et al. | |
| 2010/0255589 A1 * | 10/2010 | Saiki | B01L 3/5021 436/45 |
| 2018/0364152 A1 * | 12/2018 | Naor | G01N 21/01 |

FOREIGN PATENT DOCUMENTS

| | | | |
|---|---|---|---|
| CN | 209606425 U * | 11/2019 | |
| CN | 112005096 A * | 11/2020 | B01F 31/85 |
| DE | 10118124 A1 | 10/2002 | |
| EP | 0126007 A1 | 11/1984 | |
| JP | 2013104715 A * | 5/2013 | |
| JP | 6880928 B2 * | 6/2021 | |

* cited by examiner

DEVICE FOR MEASURING OPTICAL SPECTRUM OF FLOWING LIQUID

CROSS-REFERENCE TO RELATED APPLICATIONS

This application is a continuation of International Patent Application No. PCT/CN2023/103389 with a filing date of Jun. 28, 2023, designating the United States, now pending, and further claims priority to Chinese Patent Application No. 202211260061.2 with a filing date of Oct. 14, 2022. The content of the aforementioned applications, including any intervening amendments thereto, are incorporated herein by reference.

TECHNICAL FIELD

The present invention relates to the technical field of liquid measuring devices, and particularly to a device for measuring an optical spectrum of a flowing liquid.

BACKGROUND OF THE PRESENT INVENTION

A liquid to be detected is irradiated with light of various wavelengths (comprising deep ultraviolet light, visible light, red ultraviolet light, and near-infrared and infrared light) to obtain an optical spectrum composed of measured light absorption spectrum lines of the liquid, and then data such as chromaticity, turbidity and reducing substance content of the liquid are judged by comparing the light absorption spectrum lines with corresponding standard spectrum lines. A method for measuring a liquid concentration by spectrometry is simpler, safer and faster, and has a low measurement cost.

However, when the method is used to measure a flowing liquid in a pipeline, impurities in the liquid are inevitably attached to an optical component, and bubbles in the liquid will make the data measured by spectrometry inaccurate.

SUMMARY OF THE PRESENT INVENTION

Aiming at the above technical problem in the prior art, the present invention provides a device for measuring an optical spectrum of a flowing liquid for solving the above technical problem in the prior art.

In order to achieve the above objective, the present invention provides the following technical solution.

A device for measuring an optical spectrum of a flowing liquid comprises:

a flowing liquid mechanism, wherein the flowing liquid mechanism comprises:

a valve body, wherein a cylindrical valve cavity is formed in the valve body, an outer wall of the valve body is further provided with a valve-cavity through opening communicated with the valve cavity, so that a liquid enters the valve cavity through the valve-cavity through opening to rotate, a gas/liquid port communicated with the valve cavity is formed in a center of an end face on one side of the valve body, the flowing liquid rotates along the valve cavity, and gas and/or liquid is discharged along the gas/liquid port; and a detection mechanism, wherein the detection mechanism comprises:

a transmitting assembly, wherein the transmitting assembly is located on one side of the valve body and configured to transmit detection light, and the detection light irradiates along an axial direction of the valve cavity without passing through a central area of the valve cavity, so that the detection light penetrates through the liquid flowing along the valve cavity;

a receiving assembly, wherein the receiving assembly is configured to receive the detection light penetrating through the flowing liquid and generate a detection signal; and a processing module, wherein the processing module is configured to receive and process the detection signal.

As a further improvement of the present invention, an annular cavity is further formed in the valve cavity, a surface wall of the annular cavity is provided with a plurality of liquid inlets, the plurality of liquid inlets are arranged in a circumferential array along the annular cavity, and the liquid enters the annular cavity through the liquid inlets to rotate.

As a further improvement of the present invention, the valve body is further provided with a flushing port communicated with the valve cavity, and a backflow stopping member is arranged at the flushing port.

As a further improvement of the present invention, a flow preventing block is arranged in the backflow stopping member.

As a further improvement of the present invention, a light-transmitting member is further arranged between the transmitting assembly and the receiving assembly, and the valve body.

As a further improvement of the present invention, the transmitting assembly comprises a transmitting portion, one side of the valve body provided with the transmitting assembly is provided with a first support, and the transmitting portion is arranged on the first support.

As a further improvement of the present invention, the receiving assembly comprises a receiving portion, the other side of the valve body opposite to the side provided with the first support is provided with a second support, and the receiving portion is arranged on the second support and configured to receive the detection light; and the processing module comprises a first circuit board and a second circuit board, the first circuit board is arranged on the first support and electrically connected with the transmitting portion, the second circuit board is arranged on the second support and electrically connected with the receiving portion, and the first circuit board and the second circuit board are in communication connection.

As a further improvement of the present invention, the receiving assembly comprises a receiving portion and a reflecting portion, the other side of the valve body opposite to the side provided with the first support is provided with a second support, the receiving portion is arranged on the first support and arranged symmetrical to the transmitting portion, a reflecting light path is formed on the second support, the reflecting portion is arranged on the second support, the detection light penetrates through the flowing liquid in the valve body and then enters the reflecting light path and irradiates on the reflecting portion, and the reflecting portion reflects the detection light, so that the receiving portion receives the detection light reflected by the reflecting portion; and the processing module comprises a third circuit board, the third circuit board is arranged on the first support, and the transmitting portion and the receiving portion are electrically connected with the third circuit board respectively.

As a further improvement of the present invention, the transmitting assembly further comprises a convex lens, an incident light path for the detection light to pass through is formed in the first support, the convex lens is arranged in the incident light path, and the detection light passes through the convex lens and then irradiates into the valve cavity.

As a further improvement of the present invention, one side of the valve body far away from the transmitting assembly is further provided with a sterilizing assembly.

As a further improvement of the present invention, a TDS probe is arranged at a water outlet of the valve body.

As a further improvement of the present invention, the TDS probe is provided with a temperature sensor, and the temperature sensor is configured for temperature compensation operation.

As a further improvement of the present invention, the valve cavity is further provided with an exhaust mechanism, the exhaust mechanism comprises an exhaust valve body and an exhaust valve core, the exhaust valve body is arranged on the valve body, an exhaust cavity is formed in the exhaust valve body, the exhaust cavity is communicated with the gas/liquid port, the exhaust valve core is arranged in the exhaust cavity, the exhaust valve core is provided with a gas passing structure, and the gas passing structure is configured to lead out gas.

The present invention has the beneficial effects as follows:

1. due to the rotation of the liquid in the valve cavity, a pressure of the liquid closer to an edge area of the valve cavity is greater, so that bubbles in the liquid are squeezed and gathered at a center of the valve cavity along with the rotation of the liquid and then discharged from the gas/liquid port, thereby avoiding the interference of the bubbles on the detection light when the liquid is detected;
2. after the liquid enters the valve cavity from the valve-cavity through opening, the liquid rotates and flows in the valve cavity at a certain flow rate, so as to prolong a duration in the valve cavity, thereby fully detecting a unit amount of liquid;
3. when the liquid rotates and flows in the valve cavity, due to different angular velocities of liquids in inner and outer rings, the liquid in the valve cavity forms a stirring effect, so that the liquids are fully mixed, thereby making detection data of spectrometry more accurate;
4. the liquid rotates and flows in the valve cavity to form a flushing effect in the valve cavity, which effectively inhibits the pollution inside the valve cavity; and
5. the detection mechanism is arranged at two ends of the valve body, so that the liquid in the valve cavity is fully detected with the detection light, thereby improving the detection sensitivity and meeting a light attenuation requirement when different liquids are measured.

DESCRIPTION OF THE DRAWINGS

In the drawings, which are not necessarily drawn to scale, the same reference numerals may describe similar components in different views. The same reference numerals with letter suffixes or different letter suffixes may indicate different examples of similar components. The drawings generally illustrate various embodiments by way of example instead of limitation, and are used to explain the embodiments of the present invention together with the specification and the claims, At an appropriate time, the same reference numerals are used in all the drawings to refer to the same or similar parts. Such embodiments are illustrative, and are not intended to serve as exhaustive or exclusive embodiments of the device or method.

REFERENCE NUMERALS

Figure 1:
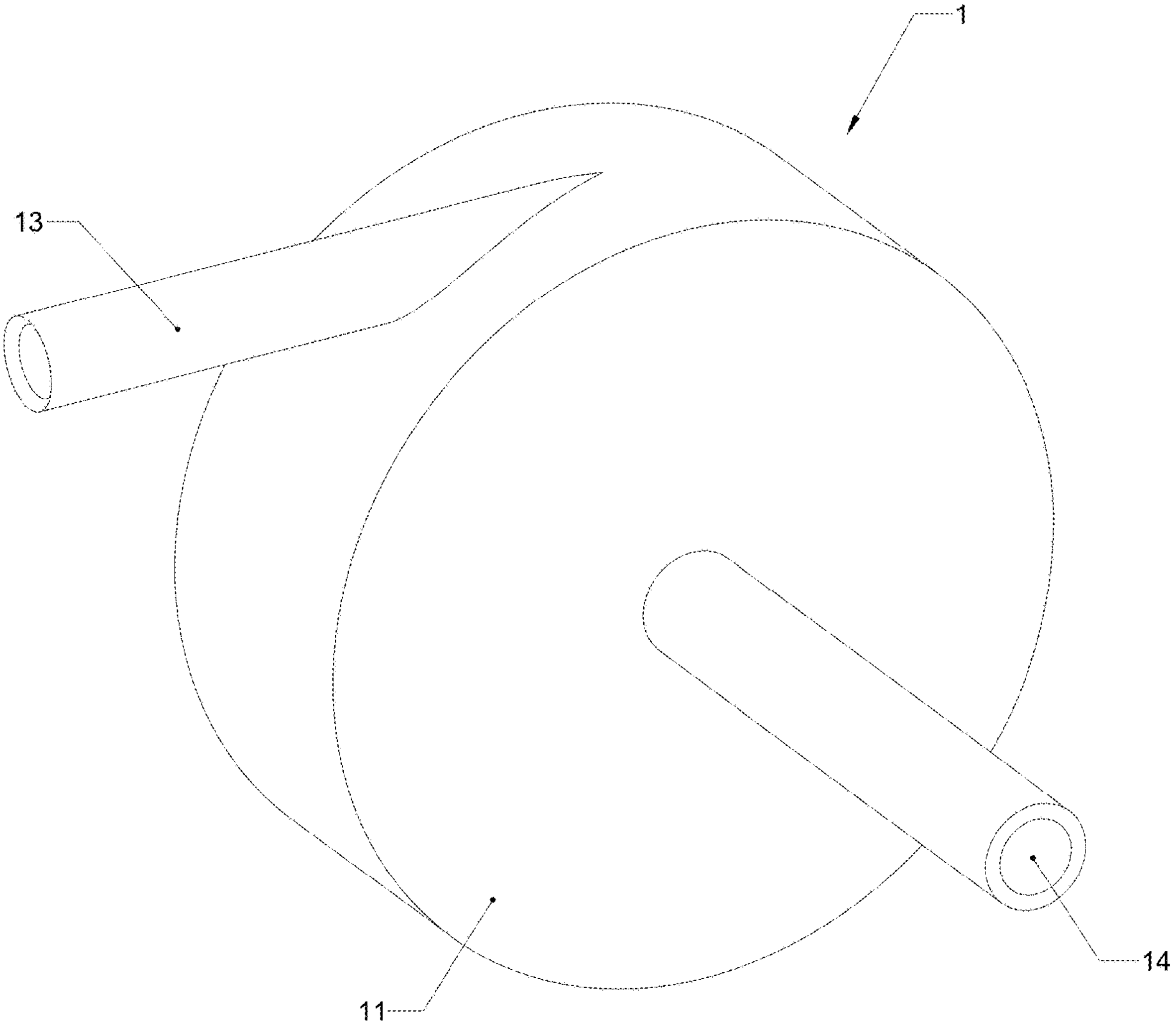
FIG. 1 is a schematic diagram of a stereoscopic structure of a flowing liquid mechanism.

1 refers to flowing liquid mechanism; 11 refers to valve body; 12 refers to valve cavity; 13 refers to valve-cavity through opening; 14 refers to gas/liquid port; 15 refers to flushing port; 16 refers to annular cavity; 17 refers to liquid inlet; 2 refers to detection mechanism; 21 refers to transmitting assembly; 211 refers to transmitting portion; 212 refers to convex lens; 22 refers to receiving assembly; 221 refers to receiving portion; 222 refers to reflecting portion; 23 refers to processing module; 231 refers to first circuit board; 232 refers to second circuit board; 233 refers to third circuit board; 3 refers to backflow stopping member; 31 refers to flow preventing block; 4 refers to light-transmitting member; 5 refers to first support; 51 refers to incident light path; 6 refers to second support; 61 refers to reflecting light path; 7 refers to sterilizing assembly; 8 refers to TDS probe; 81 refers to temperature sensor; 9 refers to exhaust mechanism; 91 refers to exhaust valve body; 92 refers to exhaust valve core; 93 refers to gas passing structure; and 10 refers to flow matcher.

DETAILED DESCRIPTION OF PREFERRED EMBODIMENTS

In order to make the objectives, technical solutions and advantages of embodiments of the present invention clearer, the technical solutions in the embodiments of the present invention are clearly and completely described hereinafter with reference to the drawings in the embodiments of the present invention. Obviously, the embodiments described are a part of, rather than all of, the embodiments of the present invention. Based on the described embodiments in the present invention, all other embodiments obtained by those of ordinary skills in the art without going through any creative work should fall within the scope of protection of the present invention.

Unless otherwise defined, the technical terms or scientific terms used in the present invention should have the general meanings understood by those with general skills in the field to which the present invention belongs. The terms “first”, “second” and the like used in the present invention do not indicate any order, quantity or importance, but are only used to distinguish different components. The terms “include”, “contain” and the like indicate that the elements or objects appearing before the terms cover the elements or objects listed after the terms and their equivalents, without excluding other elements or objects. The terms “connected”, “communicated” and the like are not limited to physical or mechanical connection, but may comprise electrical connection, whether it is direct connection or indirect connection. The terms “upper”, “lower”, “left”, “right” and the like are only used to denote the relative positional relationship. When the absolute position of the described object is changed, the relative positional relationship may be changed accordingly.

In order to keep the following descriptions of the embodiments of the present invention clear and concise, detailed descriptions of known functions and known components are omitted in the present invention.

First Embodiment

FIG. 1 to FIG. 8 show a specific implementation mode of a device for measuring an optical spectrum of a flowing liquid in the present invention, in which the device comprises a flowing liquid mechanism 1 and a detection mechanism 2. The flowing liquid mechanism 1 comprises a valve body 11, wherein a cylindrical valve cavity 12 is formed in the valve body 11, and the valve cavity 12 is specifically in a flat cylindrical shape; an outer wall of the valve body 11 is further provided with a valve-cavity through opening 13 communicated with the valve cavity 12, at least one valve-cavity through opening 13 is provided, and the valve-cavity through opening 13 is arranged tangential to the valve cavity 12, so that, when a liquid is introduced through the valve-cavity through opening 13, the liquid rotates along the valve cavity 12; and a gas/liquid port 14 communicated with the valve cavity 12 is further formed in a central position of the valve body 11, when the valve-cavity through opening 13 is only configured to input the liquid, the gas/liquid port 14 is configured to discharge gas and/or liquid, and when one port in the valve-cavity through opening 13 is configured to output the liquid, the gas/liquid port 14 is configured to discharge gas.

The detection mechanism 2 comprises a transmitting assembly 21, a receiving assembly 22 and a processing module 23, wherein the transmitting assembly 21 is located on one side of an end portion of the valve body 11 and configured to transmit detection light, and the detection light transmitted by the transmitting assembly 21 penetrates through the liquid flowing in the valve cavity 12; the receiving assembly 22 is configured to receive the detection light penetrating through the flowing liquid and generate a detection signal; and the processing module 23 is configured to receive and analyze the detection signal. A light-transmitting member 4 is arranged between the transmitting assembly 21 and the receiving assembly 22, and the valve body 11, and the detection light irradiates on the flowing liquid in the valve cavity 12 through the light-transmitting member 4. The light-transmitting member 4 may be a whole plane lens or a window forming a plane lens in an irradiation position of the detection light for the detection light to irradiate on the flowing liquid, and the light-transmitting member 4 may also be a lens in other shape, so that the detection light can straightly irradiate into the valve cavity 12 and penetrate through the flowing liquid, and then is received by the receiving assembly 22. A transmitting portion 211 comprises, but is not limited to, a light-emitting diode with a specific wavelength and an LD laser diode. When the light-emitting diode with the specific wavelength is adopted, a plurality of light-emitting diodes with specific wavelengths are combined to form a detection mode, wherein the plurality of light-emitting diodes with the specific wavelengths comprise visible light, ultraviolet light and infrared light, so as to obtain required different light absorption spectrum lines. When the LD laser diode is adopted, output optical power and light extraction wavelength of laser may change through the characteristic that a narrow linewidth and a wavelength of a tunable semiconductor laser change with modulation, so as to obtain light absorption spectrum lines to be measured.

The valve body 11 is further provided with a sterilizing assembly 7 on one side far away from the transmitting assembly 21, the sterilizing assembly 7 comprises, but is not limited to, an ultraviolet sterilization lamp, and the sterilizing assembly 7 is configured to effectively inhibit the growth of bacteria in the valve cavity 12. When the detection mechanism 2 detects the liquid flowing in the valve cavity 12, the sterilizing assembly 7 is kept turned off, which avoids an influence of the ultraviolet light for sterilization on the light absorption spectrum lines. When the detection is completed, the sterilizing assembly 7 is turned on to sterilize the valve cavity 12.

Working Principle and Effect:

The liquid is introduced through the valve-cavity through opening 13, the cylindrical valve cavity 12 facilitates the analysis and measurement of liquid flow, and when the liquid rotates in the valve cavity 12, a pressure of the liquid closer to an edge area of the valve cavity 12 is greater, so that bubbles in the liquid are squeezed and gathered at a center of the valve cavity 12 and then discharged from the gas/liquid port 14, thereby avoiding the interference of the bubbles on the detection light. Moreover, when the liquid rotates along the valve cavity 12, due to different angular velocities of liquids in inner and outer rings, the liquid in the valve cavity 12 forms a stirring effect, so that the liquids are mixed more evenly, and the cylindrical structure of the valve cavity 12 is beneficial for measuring the liquid and calculating a concentration value, thereby obtaining accurate data of detection by spectrometry. Meanwhile, the detection light transmitted by the transmitting assembly 21 penetrates through the liquid rotating and flowing, and the chromaticity, turbidity and reducing substance content of the liquid are analyzed and judged under an action of the processing module 23. When the detection is carried out, infrared light absorption spectrum lines are configured to analyze the turbidity of a water sample, visible light absorption spectrum lines are configured to analyze the chromaticity of the water sample, and ultraviolet light absorption spectrum lines are configured to analyze a pollution degree of reducing substance in the water sample and a total organic carbon (TOC) content in the water sample. Because the liquid rotates and flows in the valve cavity 12, a flushing effect is maintained inside the valve cavity 12, the pollution inside the valve cavity 12 is effectively inhibited, and the flushing effect is better especially in the edge area of the valve cavity 12, thereby ensuring the accuracy of spectroscopy measurement.

Second Embodiment

Figure 2:
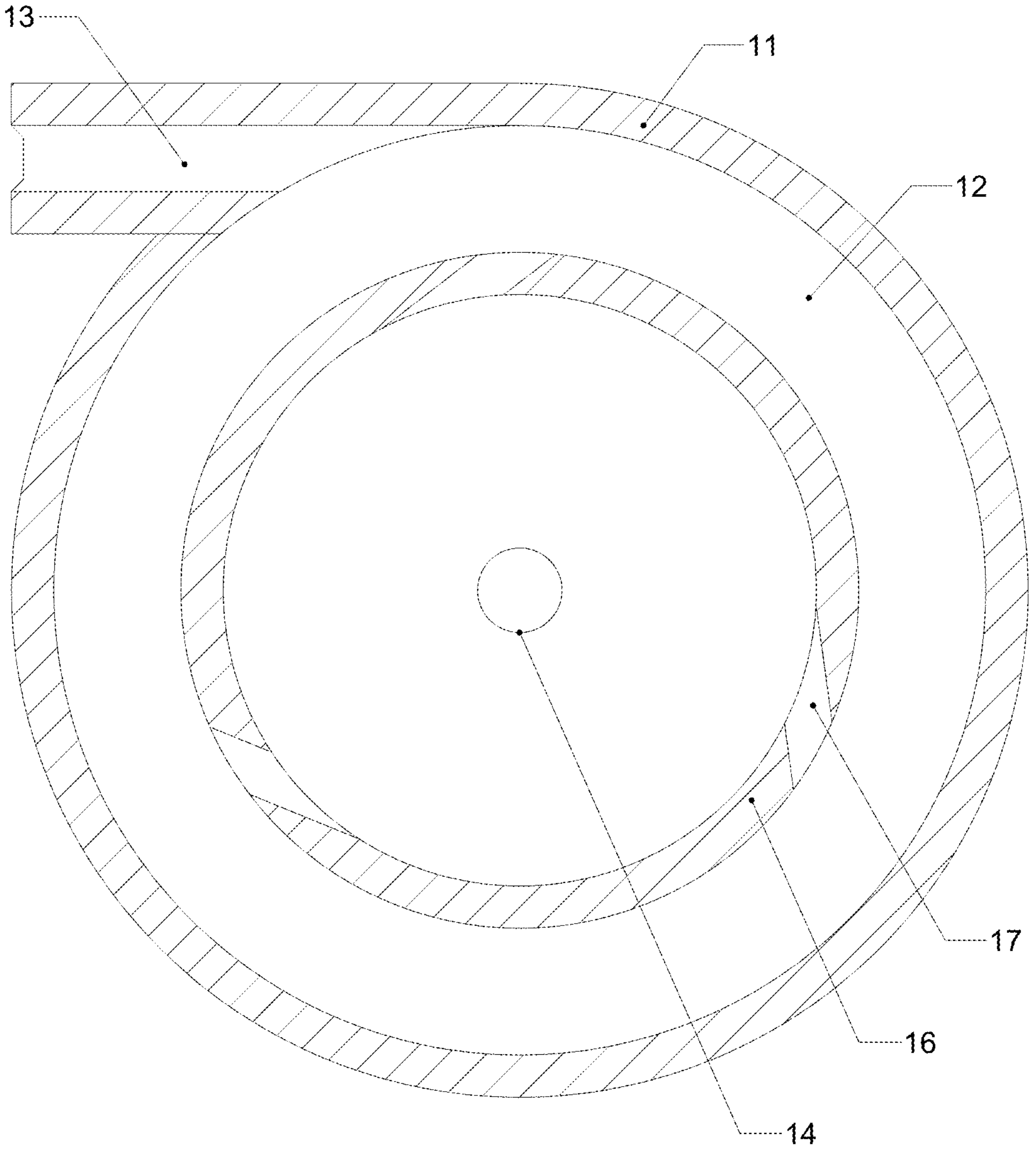
FIG. 2 is a schematic structural diagram of an annular cavity in Second Embodiment.
Figure 3:
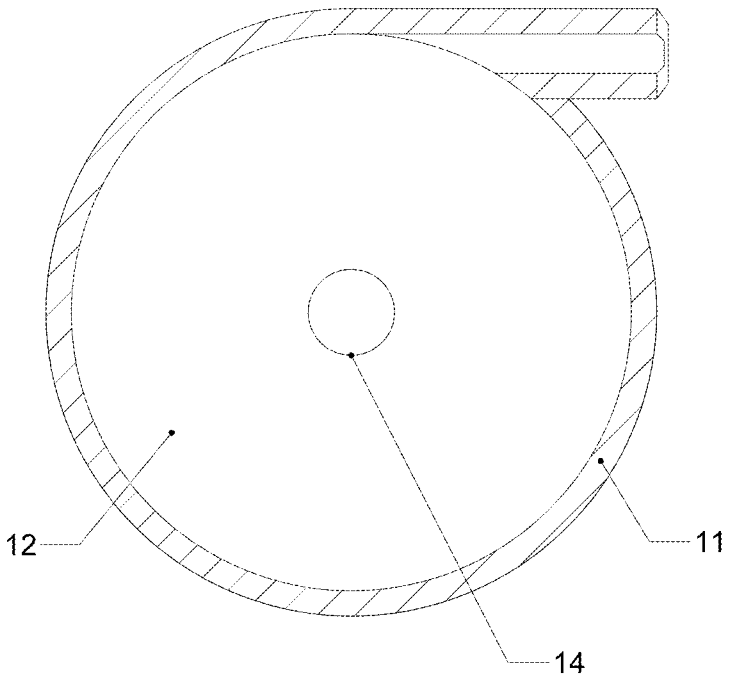
FIG. 3 to FIG. 5 are schematic structural diagrams of a valve cavity.

FIG. 1 and FIG. 2 show a specific implementation mode of a device for measuring an optical spectrum of a flowing liquid in the present invention, which is different from that of First Embodiment in the followings.

An annular cavity 16 is further formed in the valve cavity 12, a surface wall of the annular cavity 16 is provided with a plurality of liquid inlets 17, and the plurality of liquid inlets 17 are arranged in a circumferential array along the annular cavity 16. The liquid rotates along the valve cavity 12 through the arrangement of liquid inlet directions of the liquid inlets 17 with the valve cavity 12, and then enters an inner cavity through the liquid inlets 17, and when the liquid flows in the inner cavity, gas and/or liquid is discharged through the gas/liquid port 14.

Third Embodiment

Figure 6:
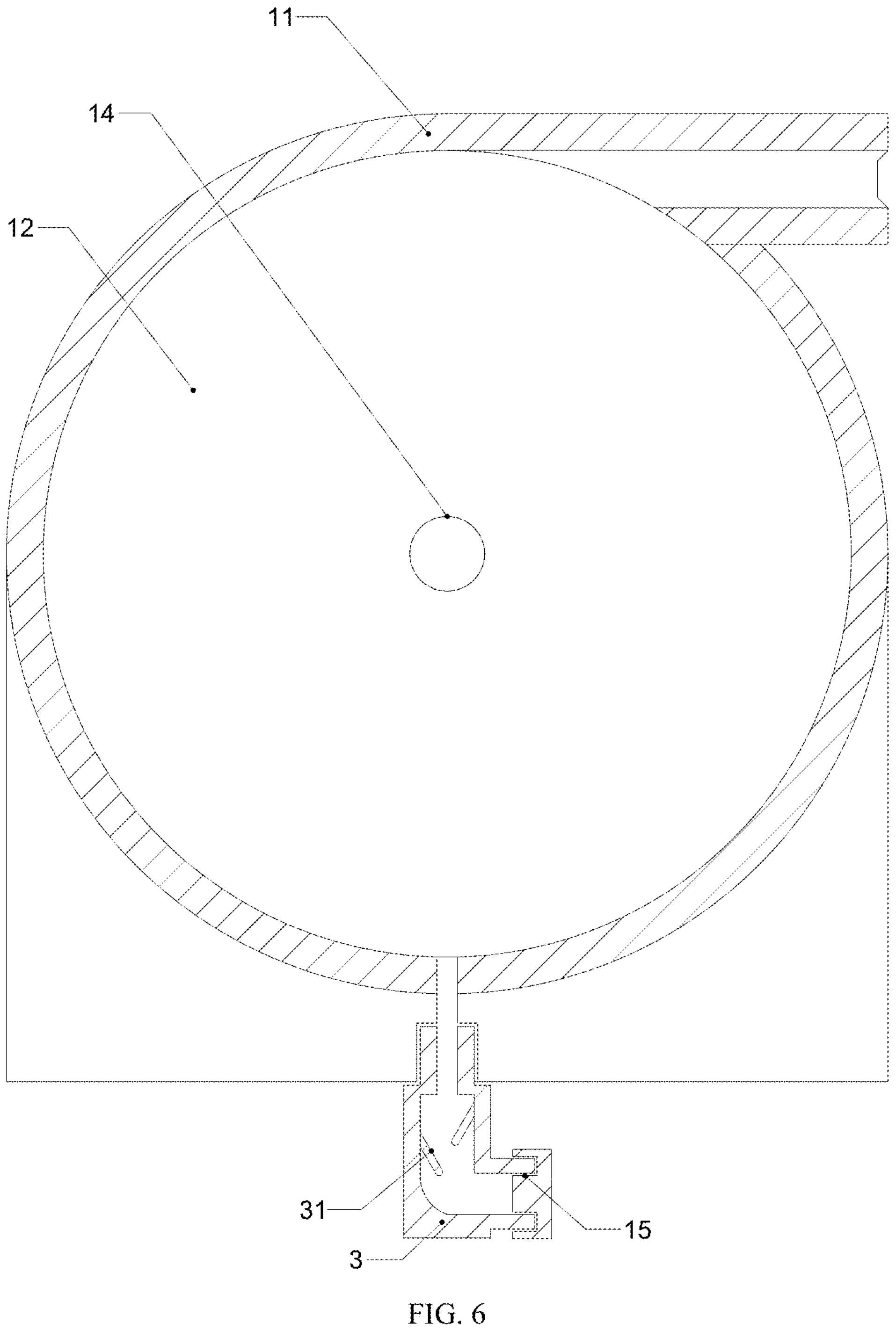
FIG. 6 and FIG. 7 are schematic structural diagrams of the flowing liquid mechanism connected with a backflow stopping member.
Figure 7:
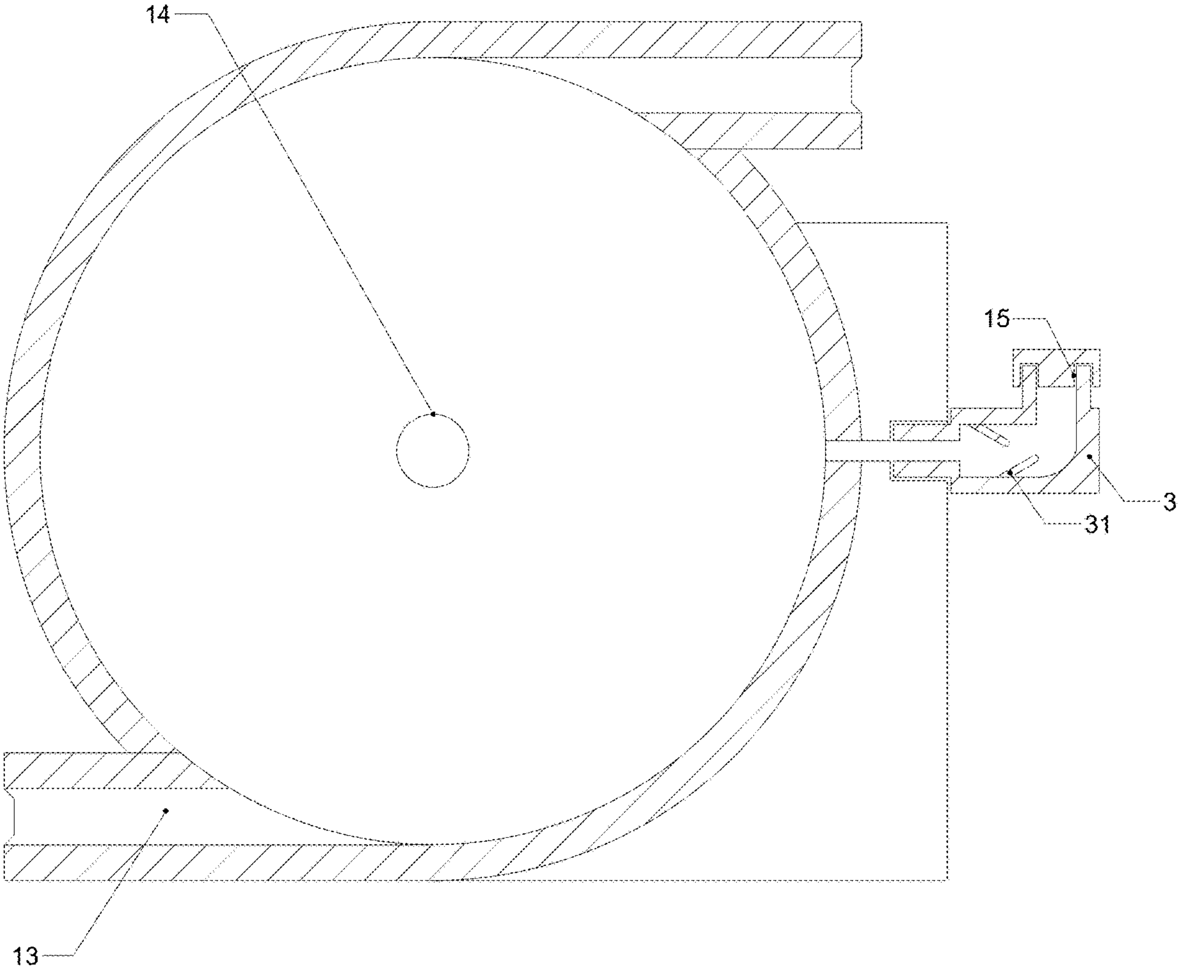

FIG. 6 and FIG. 7 show a specific implementation mode of a device for measuring an optical spectrum of a flowing liquid in the present invention, which is different from that of Second Embodiment in the followings.

The valve body 11 is further provided with a flushing port 15 communicated with the valve cavity 12, a backflow stopping member 3 is arranged at the flushing port 15, and the backflow stopping member 3 is arranged along a radial direction of the valve cavity 12. A plurality of liquid preventing blocks 31 are arranged in the backflow stopping member 3, and the plurality of liquid preventing blocks 31 are obliquely arranged along an inner wall of the backflow stopping member 3, so that a forward flow resistance along the liquid preventing blocks 31 in the backflow stopping member 3 is small, and a reverse flow resistance is large. A connecting port between the flushing port 15 and the valve cavity 12 is a narrow opening, and an opening direction is set along the radial direction of the valve cavity 12, thereby inhibiting the law that the rotation of the liquid in the cavity is disturbed due to the separation of a flowing liquid boundary layer caused by an inner end of the flushing port 15. When the flushing port 15 is opened manually or automatically, a liquid for cleaning is injected into the valve cavity 12, so as to flush a surface of the light-transmitting member 4 and other surface walls of the valve cavity 12, and then the liquid is discharged, thereby ensuring that dirt is not easily attached to the light-transmitting member 4 and the valve cavity 12, and ensuring the accuracy of spectroscopy measurement.

Fourth Embodiment

Figure 8:
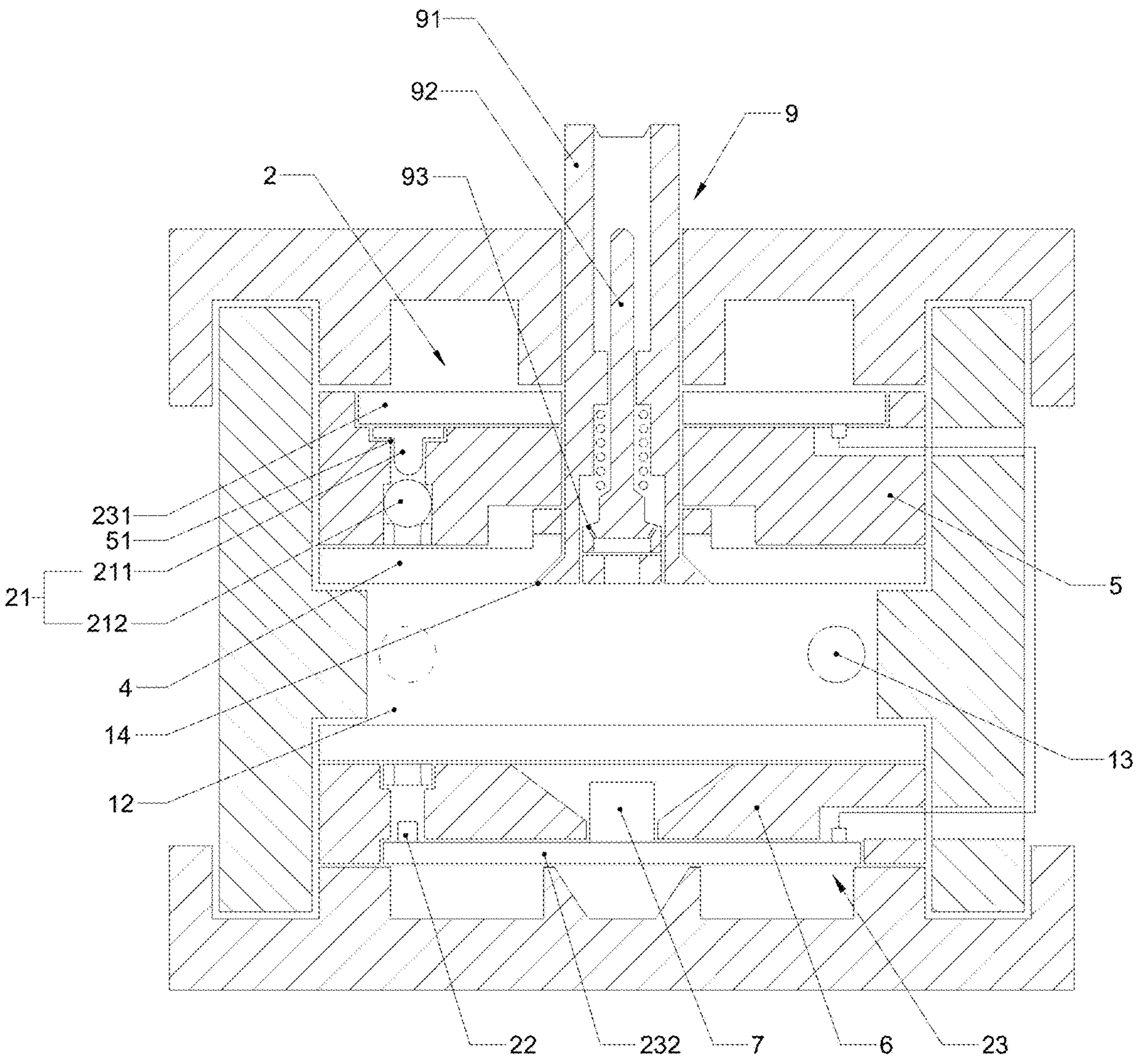
FIG. 8 is a schematic structural diagram of a detection mechanism and the flowing liquid mechanism.
Figure 9:
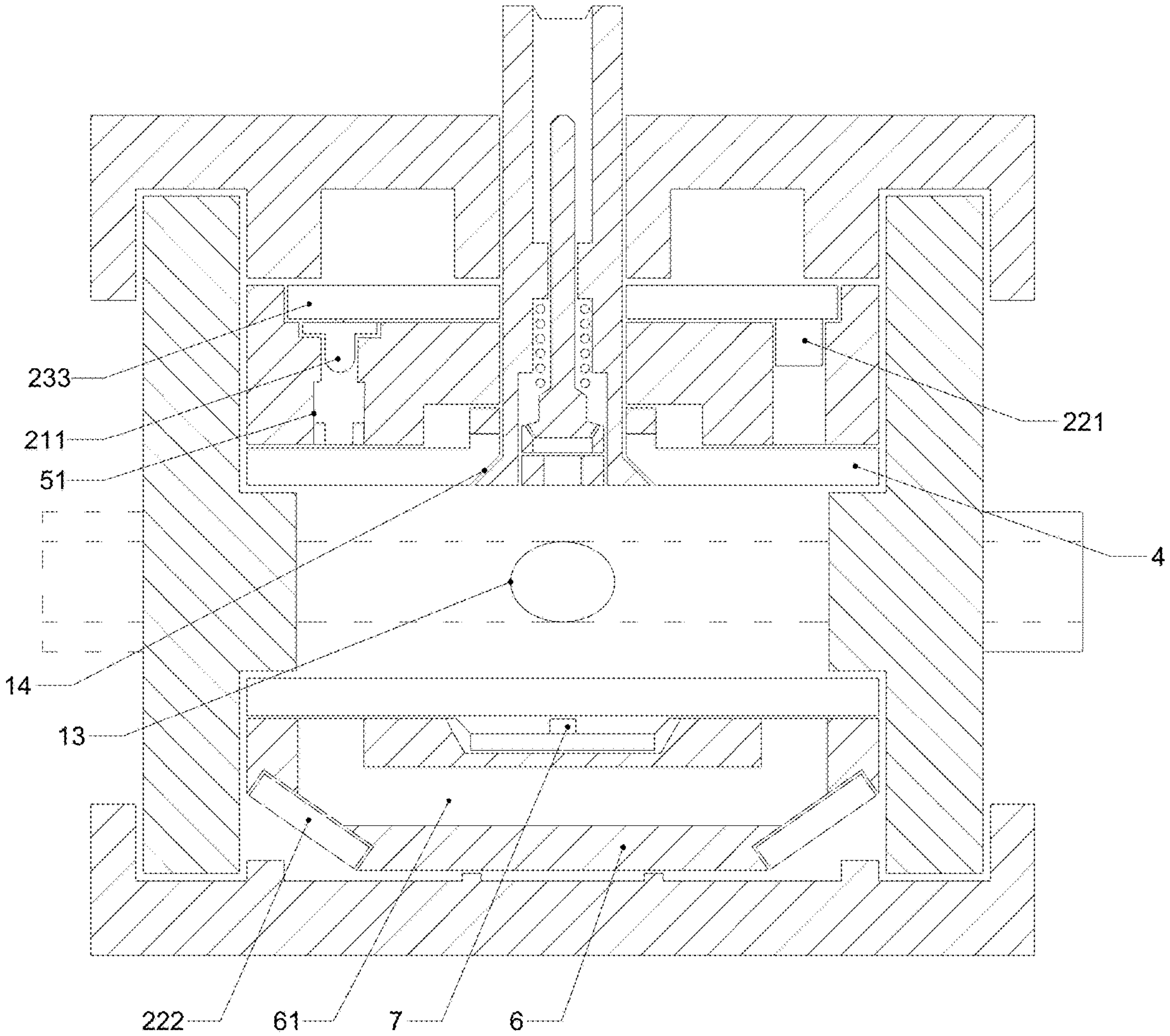
FIG. 9 is a schematic structural diagram of a detection mechanism in Fifth Embodiment.
Figure 10A:
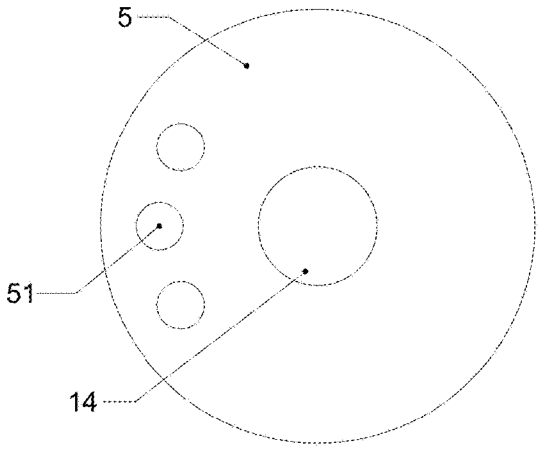
FIG. 10A and FIG. 10B are schematic structural diagrams of different numbers and distributions of receiving portions.
Figure 10B:
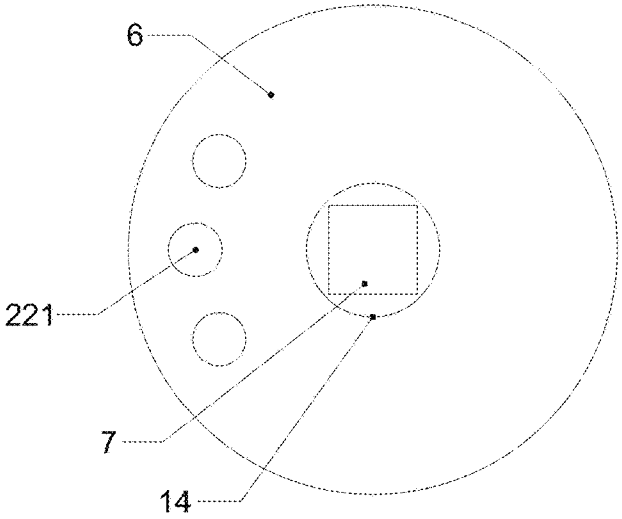
Figure 11A:
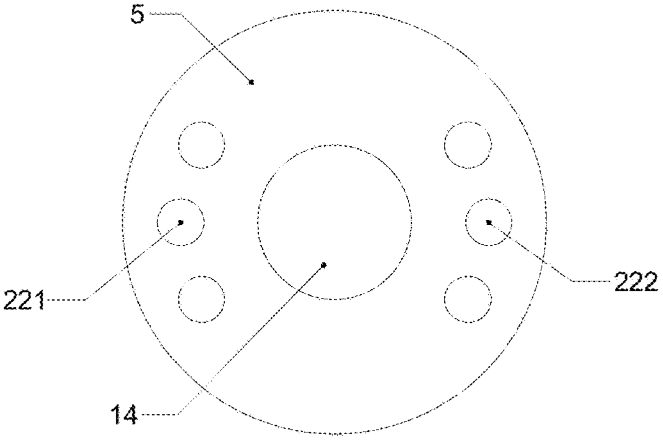
FIG. 11A, FIG. 11B and FIG. 11C are schematic structural diagrams of a reflecting portion.
Figure 11B:
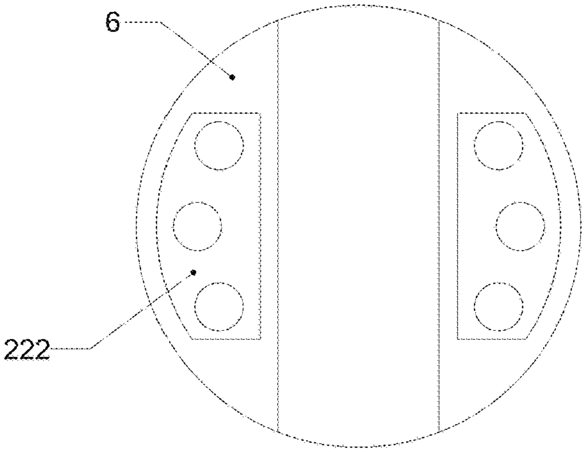
Figure 11C:
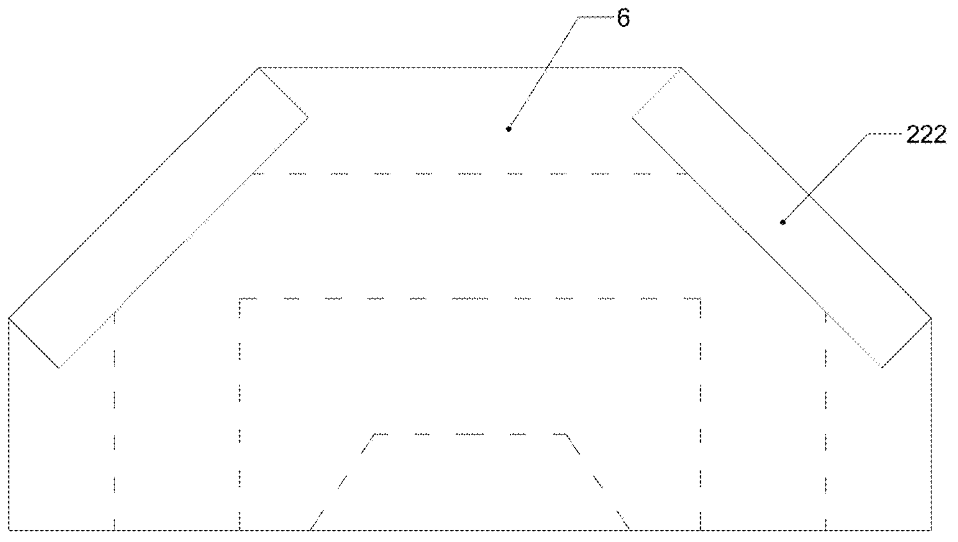
Figure 12:
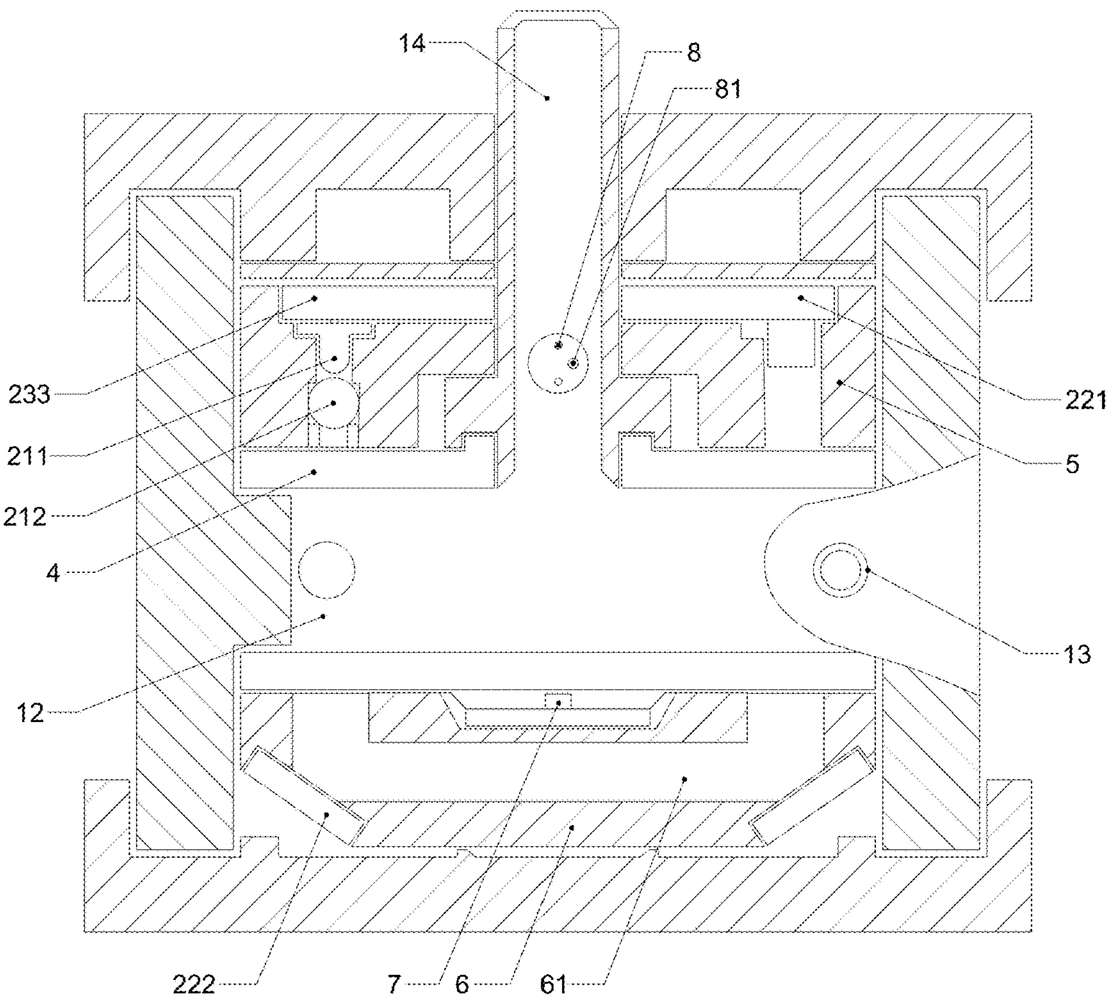
FIG. 12 is a schematic structural diagram of the detection mechanism provided with a TDS probe.
Figure 13:
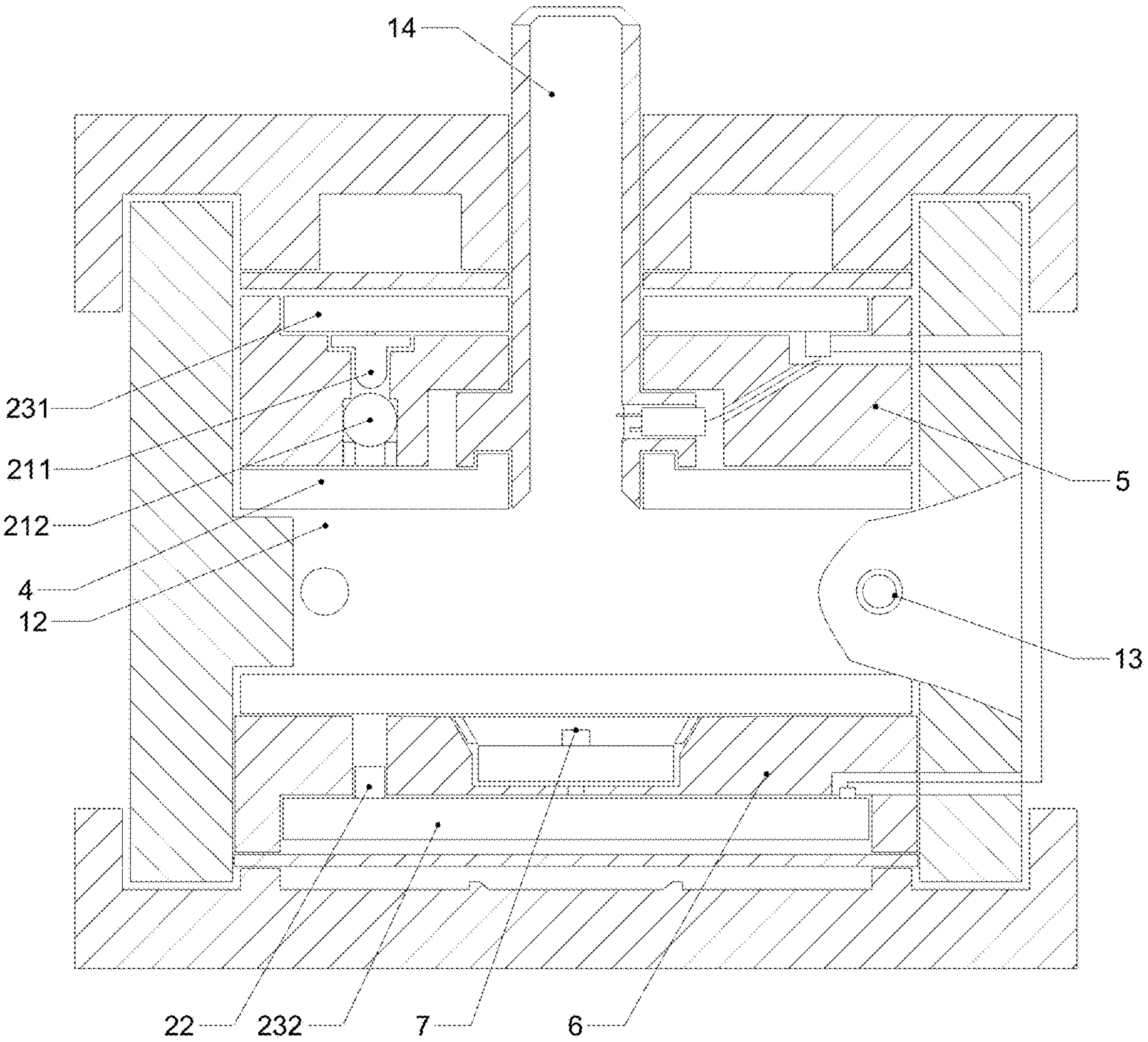
FIG. 13 is a schematic structural diagram of an arrangement mode of the TDS probe.
Figure 14A:
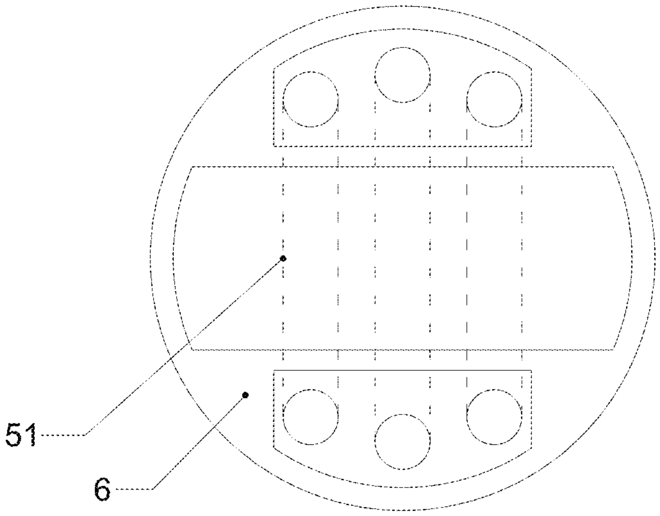
FIG. 14A and FIG. 14B are schematic structural diagrams of an incident light path.
Figure 14B:
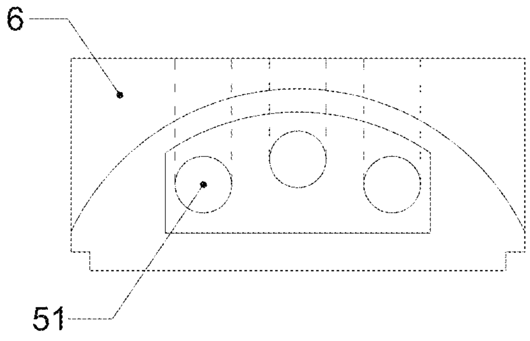
Figure 15:
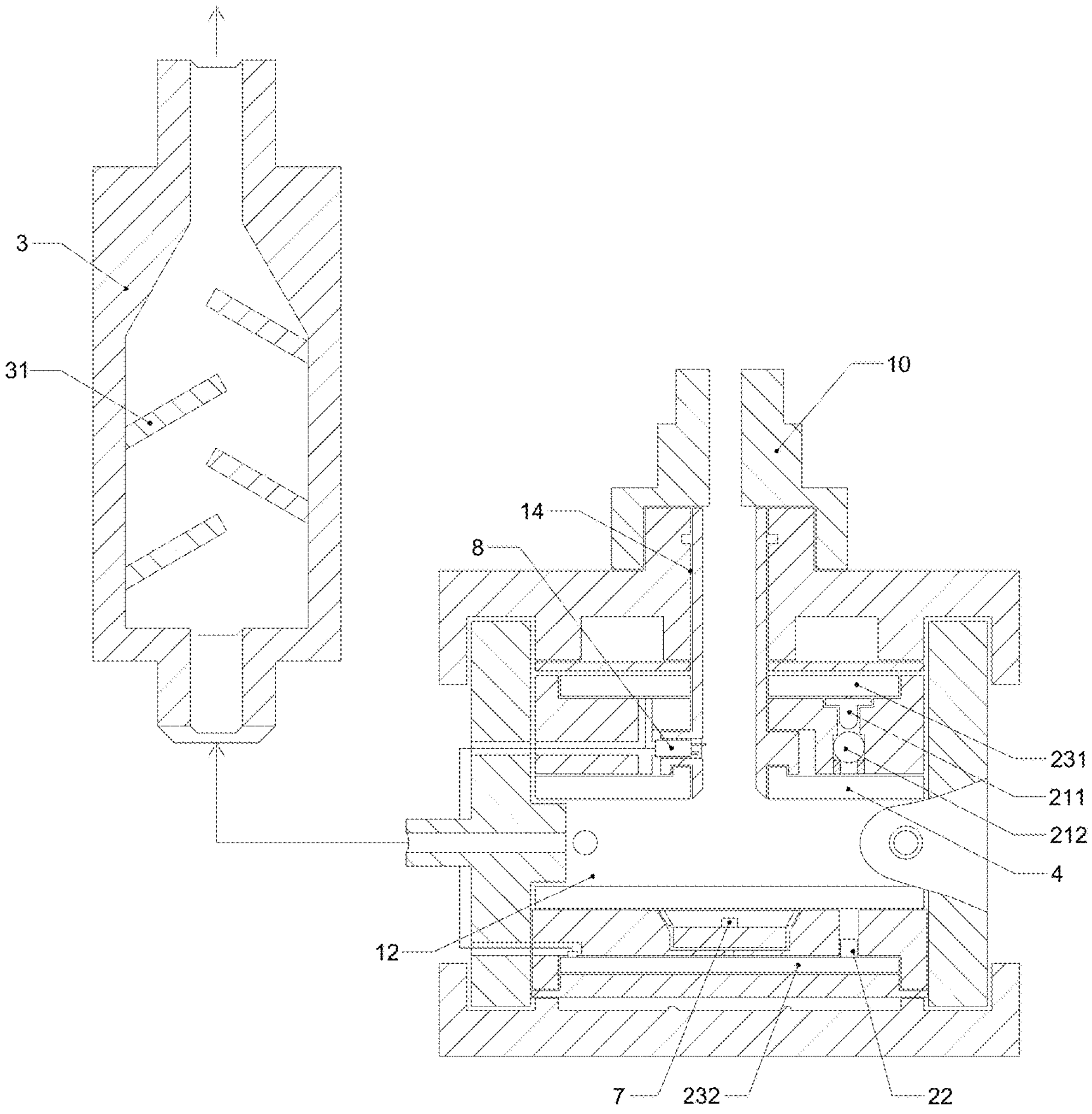
FIG. 15 is a schematic structural diagram of the flowing liquid mechanism connected with the detection mechanism and the backflow stopping member.
Figure 16A:
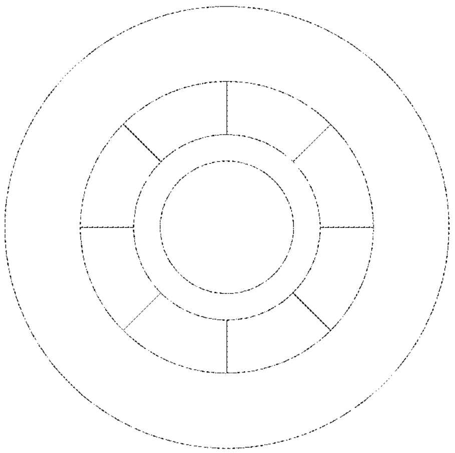
FIG. 16A and FIG. 16B are schematic structural diagrams of a flow matcher.
Figure 16B:
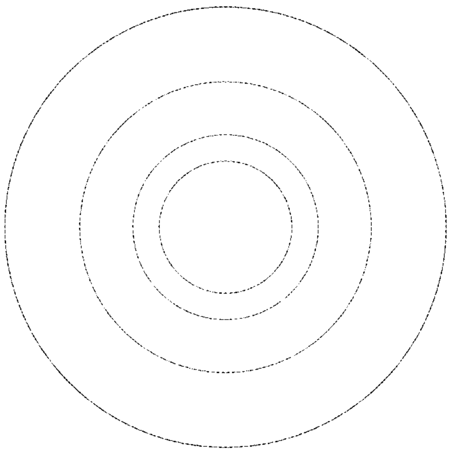

FIG. 8 and FIG. 10A and FIG. 10B show a specific implementation mode of a device for measuring an optical spectrum of a flowing liquid in the present invention, which is different from that of First Embodiment in the followings.

The transmitting assembly 21 comprises a transmitting portion 211 and a convex lens 212, and one side of the valve body 11 provided with the transmitting assembly 21 is provided with a first support 5. The receiving assembly 22 comprises a receiving portion 221, and the other side of the valve body 11 opposite to the side provided with the first support 5 is provided with a second support 6. The processing module 23 comprises a first circuit board 231 and a second circuit board 232, the first circuit board 231 is arranged on the first support 5 and electrically connected with the transmitting portion 211, the second circuit board 232 is arranged on the second support 6 and electrically connected with the receiving portion 221, and the sterilizing assembly 7 is electrically connected with the second circuit board 232. The transmitting portion 211 is configured to transmit the detection light, an incident light path 51 for the detection light to pass through is formed in the first support 5, a convex lens 212 is arranged in the incident light path 51, and the detection light is condensed through the convex lens 212, thereby enhancing the intensity of the detection light. A light condenser is further arranged in the incident light path 51, the light condenser is provided with a light condensing hole for the detection light condensed by the convex lens 212 to pass through, and the light condenser further has the function of fixing the convex lens 212. The first circuit board 231 and the second circuit board 232 are in communication connection. Therefore, the detection light passes through the light condensing hole and then irradiates on the flowing liquid in the valve cavity 12 through the light-transmitting member 4, and the receiving portion 221 receives the detection light on one side of the valve body 11 far away from the transmitting portion 211, thereby detecting the flowing liquid.

Fifth Embodiment

FIG. 9 and FIG. 11A, FIG. 11B and FIG. 11C show a specific implementation mode of a device for measuring an optical spectrum of a flowing liquid in the present invention, which is different from that of Fourth Embodiment in the followings.

The transmitting assembly 21 comprises the transmitting portion 211, and the receiving assembly 22 comprises the receiving portion 221 and a reflecting portion 222. One side of the valve body 11 provided with the transmitting assembly 21 is provided with the first support 5, and the other side of the valve body 11 opposite to the side provided with the first support 5 is provided with the second support 6. The processing module 23 comprises a third circuit board 233, the receiving portion 221 is arranged on the first support 5 and arranged symmetrical to the transmitting portion 211, the third circuit board 233 is arranged on the first support 5, and the transmitting portion 211 and the receiving portion 221 are electrically connected with the third circuit board 233 respectively. A reflecting light path 61 is formed in the second support 6. The reflecting portion 222 comprises two reflecting mirrors, the two reflecting mirrors are respectively arranged on two sides of the reflecting light path 61 in the second support 6, and the reflecting mirrors on two sides are arranged at an included angle of 90 degrees, so that the detection light penetrates through the flowing liquid in the valve body 11 and then irradiates on a first reflecting mirror on the reflecting light path 61, and then the detection light is reflected by the first reflecting mirror to a second reflecting mirror, and transmitted from the reflecting light path 61. The detection light transmitted from the reflecting light path 61 irradiates into the valve cavity 12 again to detect the flowing liquid, and penetrates through the flowing liquid to be received by the receiving portion 221. The structural arrangement of the reflecting mirrors also increases a distance length of the detection light passing through the liquid, thereby improving the measurement sensitivity and meeting a light attenuation requirement when different liquids are measured. In addition, when the detection is carried out, the detection light can penetrate through the liquid flowing in the valve cavity 12 twice, thereby achieving the effect of fully detecting the flowing liquid.

In this embodiment, if the selected transmitting portion 211 is a light-emitting diode with a specific wavelength, light may also be condensed by arranging the convex lens 212 in the first support 5. If the selected transmitting portion 211 is an LD laser diode, there is no need to arrange the convex lens 212 in the first support 5 to condense light.

Sixth Embodiment

FIG. 12 to FIG. 16A and FIG. 16B show a specific implementation mode of a device for measuring an optical spectrum of a flowing liquid in the present invention, which is different from that of Fifth Embodiment in the followings.

An outlet end of the gas/liquid port 14 is further connected with a flow matcher 10, and a limited flow channel is formed in the flow matcher 10, so as to realize limited discharge of the liquid. A TDS probe 8 is arranged at a water outlet of the valve body 11 (TDS represents a total dissolved solid in water). When the valve-cavity through opening 13 is only configured to input the liquid and the gas/liquid port 14 is configured to discharge gas and/or liquid, the TDS probe 8 is arranged at the water outlet of the gas/liquid port 14 for measuring a concentration of the liquid, and when one port in the valve-cavity through opening 13 outputs the liquid, the TDS probe 8 is arranged at the water outlet of the valve-cavity through opening 13 for outputting the liquid. The TDS probe 8 is further provided with a temperature sensor 81, and due to a temperature difference generated during flowing of the liquid, the temperature sensor 81 is configured to measure a temperature of the liquid, and configured for compensation operation of a temperature difference between spectroscopy measurement and TDS measurement. When the liquid rotates circumferentially, due to different speeds in inner and outer rings, in order to avoid an influence of flowing of the liquid on the detection carried out by the TDS probe 8 and the temperature sensor 81, the TDS probe 8 and the temperature sensor 81 are arranged at the water outlet of the liquid, so as to make accurate measurement. The temperature sensor 81 may also be replaced by an infrared temperature detector.

Seventh Embodiment

Figure 4:
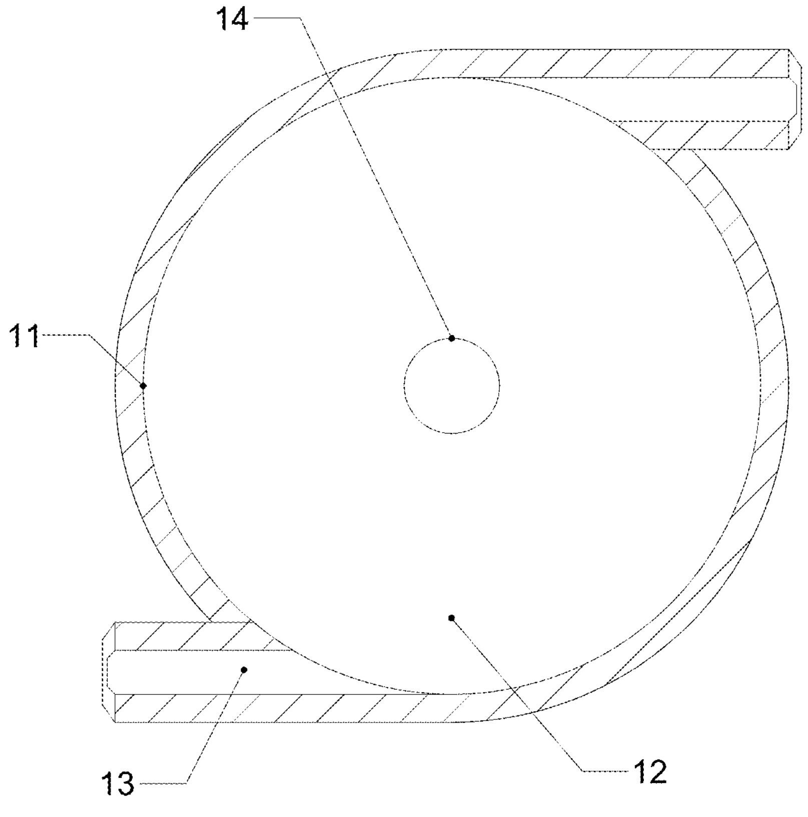
Figure 5:
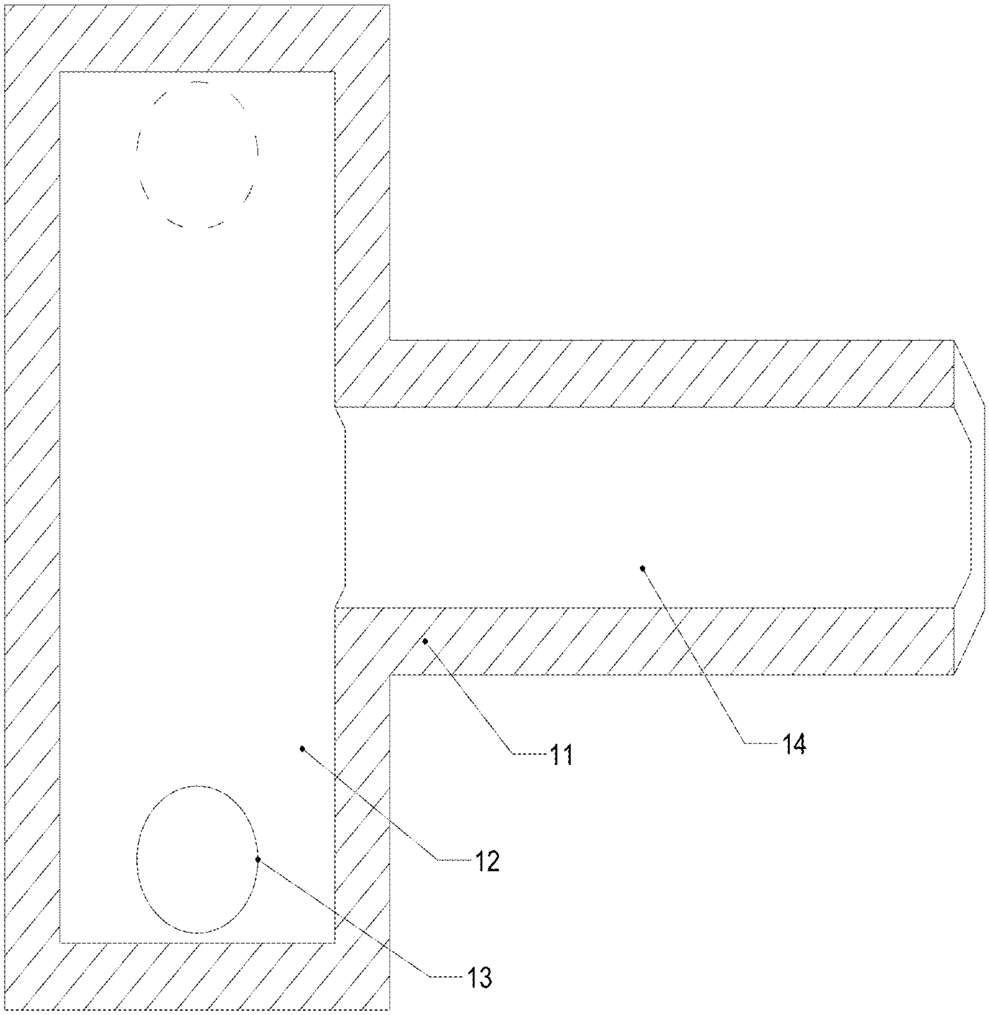

FIG. 4 and FIG. 8 show a specific implementation mode of a device for measuring an optical spectrum of a flowing liquid in the present invention, which is different from that of Fifth Embodiment in the followings.

An exhaust mechanism 9 is arranged at the gas/liquid port 14, and the exhaust mechanism 9 comprises an exhaust valve body 91 and an exhaust valve core 92. An exhaust cavity is arranged in the exhaust valve body 91, the exhaust valve core 92 is arranged in the exhaust cavity, the exhaust valve core 92 is further provided with a gas passing structure 93, and gas discharged after the liquid flows along the valve cavity 12 is effectively led out through the gas passing structure 93. When the exhaust mechanism 9 is provided, the gas/liquid port 14 is only configured to exhaust gas, and the liquid in the valve cavity 12 will be discharged from one valve-cavity through opening 13.

In addition, although the exemplary embodiments have been described in the present invention, the scope comprises any and all embodiments with equivalent elements, modifications, omissions, combinations (such as solutions in which various embodiments are intersected), adaptations or changes based on the present invention. The elements in the claims will be broadly explained based on the language adopted in the claims, and are not limited to the examples described in the specification or during the implementation of the present application, and the examples will be explained as being non-exclusive. Therefore, the specification and the examples are intended to be considered as examples only, with a true scope and spirit indicated by the following claims along with the full scope of their equivalents.

The above description is intended to be illustrative rather than limiting. For example, the above examples (or one or more solutions thereof) can be used in mutual combination. For example, those of ordinary skills in the art may use other embodiments when reading the above description. In addition, in the above specific implementations, various features may be grouped together to simplify the present invention, which should not be explained as an intention that an unclaimed disclosed feature is essential to any claim. On the contrary, the subjects of the present invention may be less than all features of particular disclosed embodiments. Therefore, the following claims are incorporated into the specific implementations herein as examples or embodiments, wherein each claim independently serves as a separate embodiment, and it is considered that these embodiments may be combined with each other in various combinations or arrangements. The scope of the present invention should be determined with reference to the appended claims along with the full range of their equivalents to which these claims are entitled.

The above embodiments are only exemplary embodiments of the present application, and are not used to limit the present invention, and the scope of protection of the present invention is defined by the claims. Those skilled in the art may make various modifications or equivalent substitutions on the present invention within the essence and the scope of protection of the present invention, and such modifications or equivalent substitutions should also be regarded as falling within the scope of protection of the present invention.

We claim:

1. A device for measuring an optical spectrum of a flowing liquid, comprising:

a flowing liquid mechanism, wherein the flowing liquid mechanism comprises:

a valve body, wherein a cylindrical valve cavity is formed in the valve body, an outer wall of the valve body is further provided with a valve-cavity through opening communicated with the valve cavity, so that a liquid enters the valve cavity through the valve-cavity through opening to rotate, a gas/liquid port communicated with the valve cavity is formed in a center of an end face on one side of the valve body, the flowing liquid rotates along the valve cavity, and gas and/or liquid is discharged along the gas/liquid port; and a detection mechanism, wherein the detection mechanism comprises:

a transmitting assembly wherein the transmitting assembly is located on one side of the valve body and configured to transmit detection light, and the detection light irradiates along an axial direction of the valve cavity without passing through a central area of the valve cavity, so that the detection light penetrates through the liquid flowing in the valve cavity;

a receiving assembly, wherein the receiving assembly is configured to receive the detection light penetrating through the flowing liquid and generate a detection signal; and a processing module, wherein the processing module is configured to receive and process the detection signal.

2. The device for measuring the optical spectrum of the flowing liquid according to claim 1, wherein an annular cavity is further formed in the valve cavity, a surface wall of the annular cavity is provided with a plurality of liquid inlets, the plurality of liquid inlets are arranged in a circumferential array along the annular cavity, and the liquid enters the annular cavity through the liquid inlets to rotate.

3. The device for measuring the optical spectrum of the flowing liquid according to claim 1, wherein the valve cavity is further provided with an exhaust mechanism, the exhaust mechanism comprises an exhaust valve body and an exhaust valve core, the exhaust valve body is arranged on the valve body, an exhaust cavity is formed in the exhaust valve body, the exhaust cavity is communicated with the gas/liquid port, the exhaust valve core is arranged in the exhaust cavity, the exhaust valve core is provided with a gas passing structure, and the gas passing structure is configured to lead out gas.

4. The device for measuring the optical spectrum of the flowing liquid according to claim 1, wherein the valve body is further provided with a flushing port communicated with the valve cavity, and a backflow stopping member is arranged at the flushing port.

5. The device for measuring the optical spectrum of the flowing liquid according to claim 4, wherein a flow preventing block is arranged in the backflow stopping member.

6. The device for measuring the optical spectrum of the flowing liquid according to claim 1, wherein a light-transmitting member is further arranged between the transmitting assembly and the receiving assembly, and the valve body.

7. The device for measuring the optical spectrum of the flowing liquid according to claim 6, wherein one side of the valve body far away from the transmitting assembly is further provided with a sterilizing assembly.

8. The device for measuring the optical spectrum of the flowing liquid according to claim 6, wherein a TDS probe is arranged at a water outlet of the valve body.

9. The device for measuring the optical spectrum of the flowing liquid according to claim 8, wherein the TDS probe is provided with a temperature sensor, and the temperature sensor is configured for temperature compensation operation.

10. The device for measuring the optical spectrum of the flowing liquid according to claim 6, wherein the transmitting assembly comprises a transmitting portion, one side of the valve body provided with the transmitting assembly is provided with a first support, and the transmitting portion is arranged on the first support.

11. The device for measuring the optical spectrum of the flowing liquid according to claim 10, wherein the receiving assembly comprises a receiving portion, the other side of the valve body opposite to the side provided with the first support is provided with a second support, and the receiving portion is arranged on the second support and configured to receive the detection light; and the processing module comprises a first circuit board and a second circuit board, the first circuit board is arranged on the first support and electrically connected with the transmitting portion, the second circuit board is arranged on the second support and electrically connected with the receiving portion, and the first circuit board and the second circuit board are in communication connection.

12. The device for measuring the optical spectrum of the flowing liquid according to claim 10, wherein the receiving assembly comprises a receiving portion and a reflecting portion, the other side of the valve body opposite to the side provided with the first support is provided with a second support, the receiving portion is arranged on the first support and arranged symmetrical to the transmitting portion, a reflecting light path is formed on the second support, the reflecting portion is arranged on the second support, the detection light penetrates through the flowing liquid in the valve body and then enters the reflecting light path and irradiates on the reflecting portion, and the reflecting portion reflects the detection light, so that the receiving portion receives the detection light reflected by the reflecting portion; and the processing module comprises a third circuit board, the third circuit board is arranged on the first support, and the transmitting portion and the receiving portion are electrically connected with the third circuit board respectively.

13. The device for measuring the optical spectrum of the flowing liquid according claim 11, wherein the transmitting assembly further comprises a convex lens, an incident light path or the detection light to pass through is formed in the first support, the convex lens is arranged in the incident light path, and the detection light passes through the convex lens and then irradiates into the valve cavity.

* * * * *